Nov. 5, 1963 F. PURJAHN 3,109,631
DEVICE FOR MIXING FLUIDS FLOWING THROUGH CONDUITS
Filed April 3, 1961 2 Sheets-Sheet 1

INVENTOR
Fritz Purjahn.
By: Samuel W. Kipnis.
Attorney.

INVENTOR
Fritz Purjahn.

BY: Samuel W. Kipnis
Attorney.

United States Patent Office 3,109,631
Patented Nov. 5, 1963

3,109,631
DEVICE FOR MIXING FLUIDS FLOWING THROUGH CONDUITS
Fritz Purjahn, Berlin-Zehlendorf, Germany, assignor to Continental Elektroindustrie A.G., Askania-Werke, Berlin-Mariendorf, Germany, a corporation of Germany
Filed Apr. 3, 1961, Ser. No. 100,058
4 Claims. (Cl. 259—4)

The invention relates to improvements in devices for homogeneously mixing fluids, such as a viscous sugar solution with water, used in the production of fruit preserves which require different concentrations depending on types of fruit and type of the ultimate product.

Heretofore, there have been used various kinds of mixing devices, in one of which one fluid component of the mixture is introduced into a stream of the other component of the mixture by means of a nozzle from which one of the components is discharged either in the direction of flow of the other component or in a direction opposed to the direction of flow of said other component. In another known mixing procedure, it is common to provide a sieve or screen beyond the point where the components to be mixed are brought together, the mixture then flowing through this screen or sieve.

The mixing device of the present invention is particularly useful in installations where the mixing is controlled. Stagnant periods should be avoided and, for this reason, mixing nozzles to be effective must effect rapid homogenization of the mixture. Known types of mixing devices do not do this and the use of sieves or screens also fail to effect such homogenization because the viscous substance easily clogs the sieve or screen apertures. Such clogging occurs because, at the screen or sieve, the flow is nonturbulent and there is no washing of the sieve or screen by a flowing liquid.

It has been found that free flowing of a viscous mixture into a flow stream is best effected by introducing the viscous mixture into the flow stream in the form of a maximum number of very small amounts, preferably in the form of drops, and under minimum pressure. It is therefore an object of the invention to provide a novel device for introducing a viscous substance into a stream of water and in such manner as to insure controlled uniformity of the mixture.

Another object is to provide novel means for mixing two or more fluids flowing through a closed conduit system.

Another object is to provide a novelly constructed, inexpensive easily serviced device for mixing controlled amounts of two or more liquid substances, and one which will not become clogged or impaired by reason of the viscosity of one or more of said substances.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Figure 1:
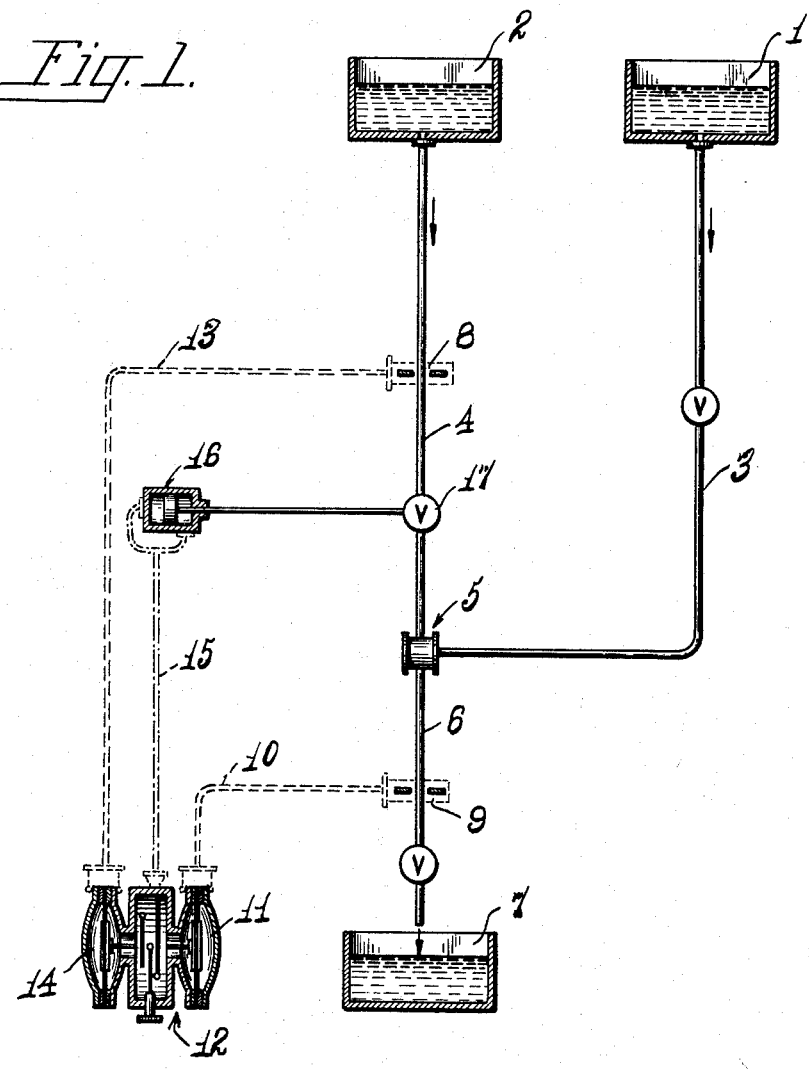
FIG. 1 is an exemplary disclosure of a multiple fluid flow system embodying the mixing device of the present invention.

Referring to the exemplary disclosure in the accompanying drawings, and particularly to FIG. 1 a system embodying the present mixing device may include an elevated tank 1 for concentrated sugar or saccharose, and an elevated tank 2 for conditioned water. Conduits 3 and 4 connect the respective tanks 1 and 2 to the novel mixing device 5, to be described in detail hereinafter, from where the mixture or solution flows through conduit 6 to a container 7. This container 7 may be a distributing manifold leading to containers of prepared fruit, or a variety of other arrangements are possible depending upon ultimate disposition and use of the mixture.

In the system illustrated herein the conduit 4 may include a measuring device, such as orifice 8, to measure the amount of water flowing through conduit 4 and a like measuring device 9 may be provided in conduit 6 to measure the amount of mixture flowing through said conduit. Such measuring devices are used for quantitative measurement of differential pressures generated at 8 and 9.

The differential pressure occurring at device 9 is fed via a pressure line 10 to a differential pressure measuring device 11 forming a part of a jet pipe controller 12; whereas differential pressure occurring at measuring device 8 operates in the same manner via a pressure line 13 to a corresponding differential pressure measuring device 14 in controller 12. Since the controller 12 constitutes no part of the present invention and is fully described in detail in a copending application, Serial No. 824,429, filed July 1, 1959, now abandoned, it is believed sufficient to note only that said controller operates in response to pressure differentials at 11 and 14 to vary the pressure in a conduit 15 controlling operation of a hydraulic motor 16 operable for controlling a flow regulator valve 17 in conduit 4.

Figure 2:
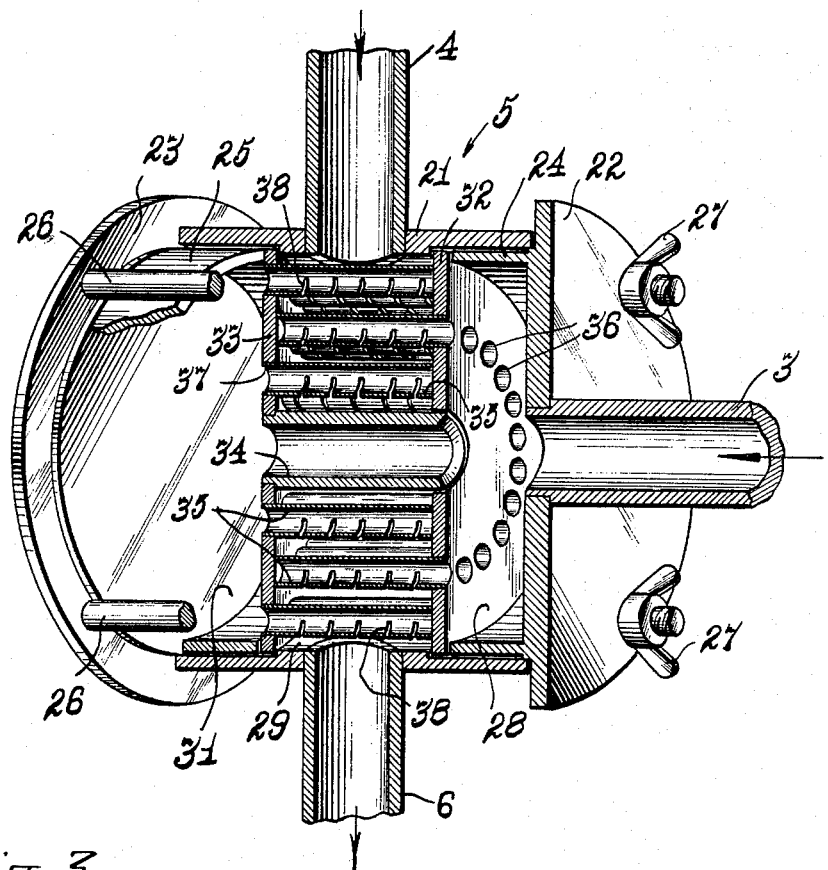
FIG. 2 is an enlarged perspective view of the novel mixing device partly broken away to illustrate structural details thereof.

Referring now to the construction and operation of the mixing device 5, which is best shown in FIG. 2, said device is essentially a drum-like structure or vessel including a cylindrical shell 21 closed at one end by an end wall 22 and at its other end by an end wall 23. These end walls preferably are flanged as at 24—25, respectively, which flanges are telescoped into the respective ends of shell 21 and the assembly may be detachably secured as by means of tie rods 26 carried by one of the end walls and extending through the shell and through the other end wall to receive wing nuts 27 on their projecting threaded ends.

The end wall 22 has an axial opening into which the open end of conduit 3 is fitted so as to permit fluid flowing in said conduit to enter the interior of the mixing device 5. The interior of said device is divided into three chambers 28, 29 and 31 by the provision of spaced apart circular partition walls 32, 33 which may be held in place by cover flanges 24, 25 respectively. As shown, the middle chamber 29 is in direct communication with conduits 4—6 so that fluid flowing through said conduits passes through said middle chamber. Fluid flowing into end chamber 28 through conduit 3 also flows into the other end chamber 31 through an axial passageway 34.

The middle chamber 29 contains a plurality of distributing conduits 35 that extend in a direction transversely to the flow through said middle chamber. These conduits preferably are arranged in alternate circular rows on the partition walls 32—33 and, as shown in the disclosed embodiment, one row of said conduits 35 opens into end chambers 28 through openings 36. The remaining rows of said conduits 35 open into end chamber 31 through openings 37. Conduits 35, which are in the form of short tubes, have longitudinally spaced slotted apertures 38 therein through which sugar solution entering said tubes from chambers 28—31 seeps and is washed off by the flow of water through the middle chamber 29. This arrangement provides a large contact area between the sugar solution and the water which brings about rapid homogenization.

Figure 3:
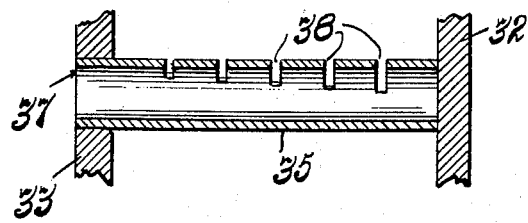
FIG. 3 is an enlarged detail sectional view of a distributing conduit.

Because the short conduits or tubes 35 are fed from one end only, a pressure drop occurs as the closed end of each tube is approached and the amounts discharged through the slotted apertures 38 in each is proportionate to the local pressure prevailing at each aperture. Accordingly were the slotted apertures of uniform size the discharge would not be equal throughout the whole cross sectional area of the mixture component flowing through the middle chamber, thus affecting the rate of homogenization. To eliminate this disadvantage, the cross section of the slotted discharge apertures 38 is made progressively larger as the closed end of a tube is reached thus compensating for the reduced pressure at said remote ends of the tubes. This is perhaps best illustrated in FIG. 3. As a result, the same amounts of sugar solution are discharged through all of the apertures 38.

An alternate structure would be to permit all of the tubes 35 to open into both chambers 28—31 to allow the solution to flow thereinto at both ends. In such instance, the center conduit or axial passageway 34 may be eliminated or under certain instances of application, a second inlet conduit (not shown) responding to conduit 3 may be connected with chamber 31 so as to deliver like or different solutions into the mixing device.

The mixing device herein disclosed differs from prior known devices in that only a small excess pressure is required in order to mix the components.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

Having thus described the invention, what is claimed as new and desired to be secured by Letters Patent of the United States is:

1. A device for homogeneous mixing of two or more fluid substances flowing through conduits, said device comprising a multi-chambered body, a conduit connected with a first chamber for flowing one of said fluid substances therethrough, a conduit connected with a second chamber and into which a fluid substance is flowed, a conduit connecting said second chamber with a third chamber, a plurality of distribution conduits each in flow communication at one end with said second chamber, a plurality of distribution conduits each in flow communication at one end with said third chamber, all of said conduits being closed at their other ends and extending into the first chamber in a plane transversely of the direction of flow of fluid through said first chamber, and said distribution conduits having discharge openings for distributing solution flowing into the distribution conduits uniformly into the fluid substance flowing through the first chamber.

2. The device recited in claim 1, in which the discharge openings are longitudinally spaced circumferential slots.

3. The device recited in claim 1, in which the cross-sectional area of the discharge openings in each distributing conduit is progressively increased as the closed end of such conduit is approached.

4. A device for homogeneous mixing of two or more fluid substances of different consistency, said device comprising a chambered body, an inlet and an outlet in a first chamber for flowing one of said fluid substances therethrough, an inlet for a second chamber for admitting a fluid substance into said second chamber, a plurality of distribution conduits in communication with said second chamber and extending into the first chamber in a direction perpendicular to the direction of fluid flow through said first chamber, and said distribution conduits having circumferentially extending slots mutually spaced therealong and opening in the general direction of fluid flow through the first chamber for distributing solution flowing into the distribution conduits uniformly into the fluid substance flowing through the first chamber.

References Cited in the file of this patent
UNITED STATES PATENTS

| | | |
|---|---|---|
| 172,588 | Seibel | Jan. 25, 1876 |
| 2,647,732 | Jarman | Aug. 4, 1953 |
| 2,777,467 | Powell et al. | Jan. 15, 1957 |